Nov. 20, 1951     J. M. O'MALLEY     2,575,830
THRUST BEARING
Filed March 20, 1947
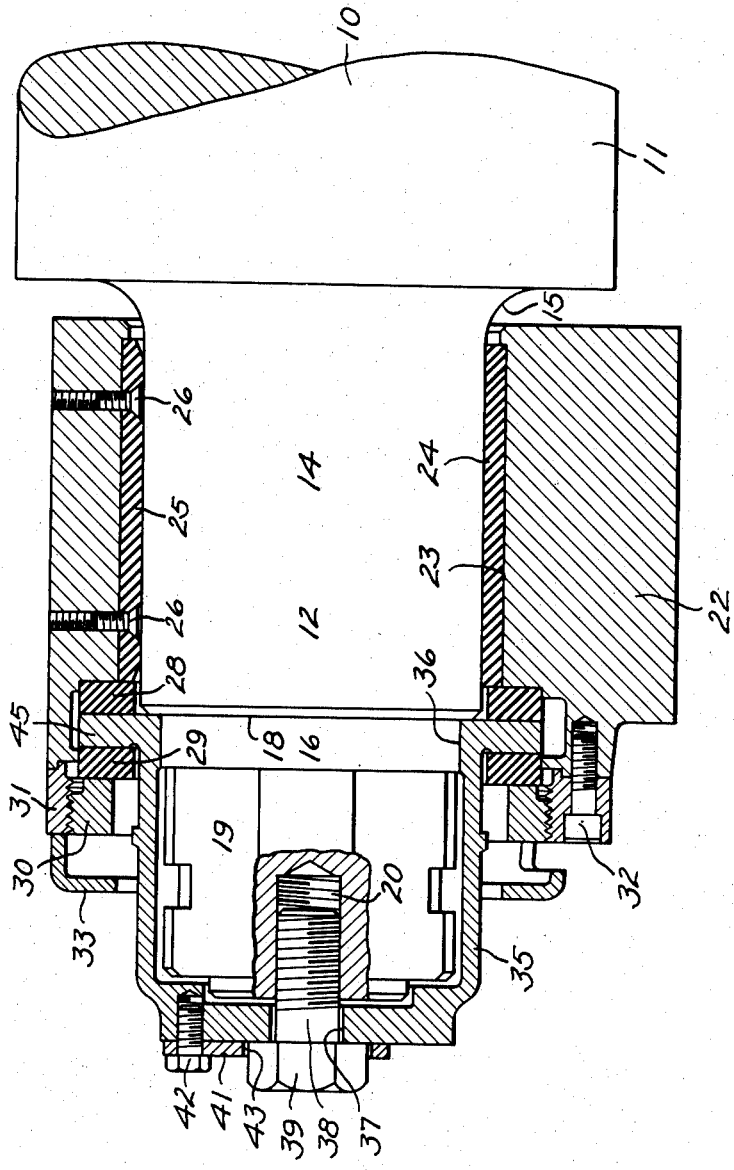
INVENTOR.
JOSEPH M. O'MALLEY
BY
*Albert G. Bludget*
ATTORNEY Patented Nov. 20, 1951

2,575,830

UNITED STATES PATENT OFFICE 2,575,830

THRUST BEARING

Joseph M. O'Malley, Worcester, Mass., assignor to Morgan Construction Company, Worcester, Mass., a corporation of Massachusetts Application March 20, 1947, Serial No. 736,062

3 Claims. (Cl. 308—163)

This invention relates to bearings, and more particularly to bearings for supporting the necks of rolling mill rolls and the like.

A rolling mill, as employed for example in the rolling of metal, comprises a pair of rolls between which the metal bar or the like travels. Each roll ordinarily comprises a central body or barrel, with a neck of reduced size at each end of the barrel, each of the roll necks being shaped to provide a wabbler at its outer end. The necks are supported in bearings, and a suitable universal spindle is connected to one of the wabblers to drive the roll. The other wabbler serves as a spare in order that the roll may be kept in service, by turning it end for end, in the event the first wabbler becomes badly worn.

The roll neck bearings in such a mill are subjected to heavy radial loads resulting from the roll-separating forces produced in the process of rolling. In addition, axial thrust loads are encountered, and it is a common practice to construct the bearing at one end of each roll to withstand thrust loads in both directions, so that the rolls will be held in their proper positions endwise. For this purpose a flange has been mounted on the roll to rotate therewith in sliding contact with suitable stationary thrust bearing surfaces. To fasten the flange in place it has been the practice to form a circumferential groove in the roll neck, adjacent the inner end of the wabbler, the groove being shaped to receive an externally threaded ring which is divided in an axial plane into two pieces for assembly purposes. A nut is mounted on the ring to clamp the thrust flange against a shoulder on the roll neck. The groove appreciably decreases the torsional strength of the roll neck, and there is accordingly more likelihood that the wabbler at the driven end of the roll may be twisted off under heavy load conditions. Furthermore the construction requires considerable accurate machining of the various parts, and it is therefore relatively expensive.

It is accordingly one object of the invention to provide a roll neck bearing so constructed and arranged that its associated roll may be made axially reversible and the roll wabblers may have greater strength to resist torsion.

It is a further object of the invention to provide an improved construction for a roll neck bearing of the combined thrust and radial load type, adapted to support an axially reversible roll, and a simple and relatively inexpensive means for securing the bearing to one neck of the roll.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, the single figure is a fragmentary view of a rolling mill roll with a roll neck bearing mounted thereon, the bearing being shown in longitudinal section and the roll wabbler being partially broken away for clearness of illustration.

The embodiment illustrated comprises a roll 10 having a central body or barrel 11 and a roll neck 12 extending coaxially from the end of the barrel. This roll neck includes a bearing portion 14 which is connected to the barrel by a fillet 15. As shown, the bearing portion 14 is cylindrical so that it may serve as a journal, but it will be apparent that in accordance with known practice as disclosed in the patent to Dahlstrom No. 2,018,055, dated October 22, 1935, a tapered or frusto-conical neck may be employed, such a neck being surrounded by a sleeve correspondingly tapered inside and having an outer cylindrical surface, the sleeve forming the journal. The roll neck 12 further includes a relatively short portion 16 adjacent the outer end of the bearing portion 14 and having a cylindrical surface somewhat smaller in diameter than the bearing portion, there being an outwardly facing shoulder 18 between the portion 16 and the bearing portion. The roll neck further includes at its outer end a wabbler 19 of the usual longitudinally fluted type. This wabbler is provided with a threaded axially located hole 20, for a purpose which will be explained later herein. Only one end of the roll 10 is shown, since the opposite end is preferably identical in construction. It will be understood that the wabbler at the opposite end of the roll will be connected to a suitable universal driving spindle in known manner.

The roll neck 12 at one end of the roll is mounted in a bearing which serves to resist not only radial loads but also thrust loads in both directions. For this purpose the roll neck is surrounded by a bearing chock 22 having a cylindrical bore 23 therein slightly larger in diameter than the cylindrical portion 14. The particular bearing illustrated is intended for use with the lower roll of a horizontal roll stand. Consequently the radial load resulting from the rolling pressure, as well as the weight of the roll, is downward. To receive this radial load a liner 24 is mounted within the lower portion of the bore 23 in contact with the cylindrical portion 14 of the roll neck. If the bearing is to be water lubricated, the liner 24 is preferably made of a phenolic resin or other suitable non-metallic material. Within the upper portion of the bore 23 there is mounted a liner 25 of a similar material which is fastened to the chock 22 by means of screws 26. The liner 25 serves primarily as a buffer to prevent contact between the chock and the roll neck when the bearing is being placed upon the roll neck. Within the outer portion of the chock there are mounted two axially spaced stationary thrust rings 28 and 29 which surround the roll neck adjacent to the shoulder 18. These rings may be of the same material as the liner 24. The inner ring 28 is supported against inward movement by the body of the chock, and the outer ring 29 is supported against outward movement by an externally threaded retaining ring 30 which is mounted within an internally threaded outward extension 31 of the chock. To facilitate manufacture and assembly, the extension 31 may be formed separately from the body of the chock and fastened thereto by screws 32 (only one of which appears in the drawing). For a detailed disclosure of a suitable construction for keying the thrust rings 28 and 29 against rotation, and for locking the threaded ring 30 in place, reference may be had to the patent to Rich et al. No. 2,367,613, dated January 16, 1945. Preferably an annular splash guard 33 is removably secured to the extension 31.

Means is attached to the roll neck 12 to transmit axial thrust from the roll to the thrust rings 28 and 29. For this purpose a hollow cap 35 of generally cylindrical form is provided to enclose the wabbler 19, the inner portion of this cap having a cylindrical bore 36 which accurately fits the cylindrical surface 16. A clearance space is provided between the cap and the wabbler throughout substantially the entire length of the wabbler. The cap extends outwardly through the retaining ring 30 and the outer end of the cap is provided with a hole 37 to receive a screw 38 with a hexagonal head 39. This screw enters the threaded hole 20 in the wabbler and urges the inner end of the cap 35 firmly against the shoulder 18 on the roll neck. To prevent loosening of the screw 38, a locking plate 41 is fastened to the outer end of the cap 35 by a screw 42, this plate having a hexagonal hole 43 therein to receive the head 39. Adjacent the inner end of the cap 35 there is provided a flange 45 which extends between the two rings 28 and 29 to form a thrust collar. The opposite sides of this flange form thrust bearing surfaces which lie in planes perpendicular to the axis of the roll.

The operation of the invention will now be apparent from the above disclosure. Radial loads due to the roll-separating forces are transmitted through the cylindrical portion 14 of the roll neck 12 to the bearing liner 24. Thrust loads are transmitted through the flange 45 to the ring 28 or to the ring 29, dependent upon the direction of the thrust. The threaded ring 30 may be adjusted to take up wear on the rings 28 and 29. When the wabbler at the opposite or driven end of the roll becomes worn, the roll may easily be turned end for end. The entire bearing can be readily withdrawn endwise from the roll neck after the screw 42, the locking plate 41, and the screw 38 are removed. Since the roll neck is not grooved circumferentially for a divided externally threaded ring, as in prior constructions, it is much stronger in torsion, and there is far less danger of twisting off the wabbler on the driven end of the roll. The construction is simple, rugged and comparatively inexpensive to manufacture.

Having thus described my invention, what I claim as new and desire to secure by Letters Patent is:

1. A bearing for a rotatable roll neck or the like having at its outer end a wabbler of non-circular transverse cross section, the said bearing comprising a hollow chock adapted to surround the roll neck, a liner within the chock providing a plain sliding bearing surface to receive radial loads, two axially spaced thrust rings located within the outer portion of the chock and providing opposed plain sliding bearing surfaces to receive thrust loads, a retaining ring secured to the outer end of the chock and engaging the outer thrust ring to support it against outward movement, a cap adapted to enclose the wabbler and of such size and shape as to provide a clearance space between the cap and the wabbler throughout substantially the entire length of the wabbler and extending outwardly through the retaining ring, a thrust collar adjacent the inner end of the cap and extending between the two thrust rings, and readily accessible means to fasten the outer portion of the cap to the outer end of the wabbler.

2. A bearing as set forth in claim 1, in which the cap is provided adjacent its inner end with a cylindrical bore adapted to engage an external cylindrical surface of like diameter on the roll neck.

3. A bearing for a rotatable roll neck or the like having at its outer end a wabbler of non-circular transverse cross section with an axially located threaded hole in the outer end of the wabbler, the said bearing comprising a hollow chock adapted to surround the roll neck, a liner within the chock providing a plain sliding bearing surface to receive radial loads, two axially spaced thrust rings located within the outer portion of the chock and providing opposed plain sliding bearing surfaces to receive thrust loads, a retaining ring secured to the outer end of the chock and engaging the outer thrust ring to support it against outward movement, a cap adapted to enclose the wabbler and of such size and shape as to provide a clearance space between the cap and the wabbler throughout substantially the entire length of the wabbler, the cap extending outwardly through the retaining ring, a thrust collar adjacent the inner end of the cap and extending between the two thrust rings, the cap having a centrally located hole through its outer end, and a screw extending through the hole in the cap for engagement with the threaded hole in the wabbler.

JOSEPH M. O'MALLEY.

REFERENCES CITED

The following references are of record in the file of this patent:

UNITED STATES PATENTS

| Number | Name | Date |
|---|---|---|
| 564,302 | Brightman | July 21, 1896 |
| 1,654,235 | Biggert | Dec. 27, 1927 |
| 1,839,497 | Peterson | Jan. 5, 1932 |
| 2,081,055 | Dahlstrom | Oct. 22, 1935 |
| 2,200,837 | Fass | May 14, 1940 |